UNITED STATES PATENT OFFICE.

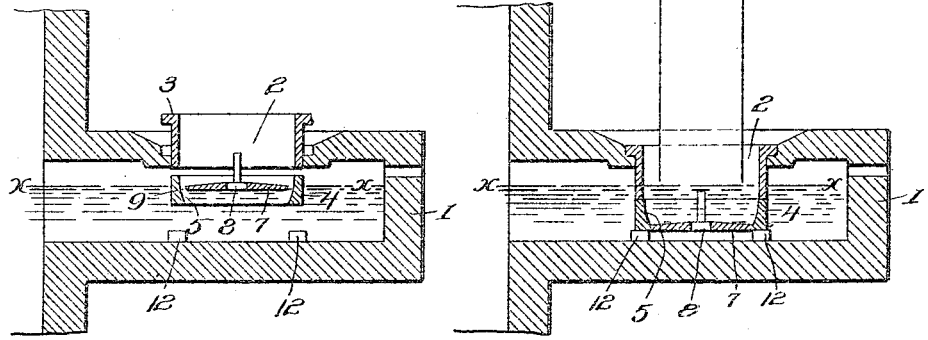
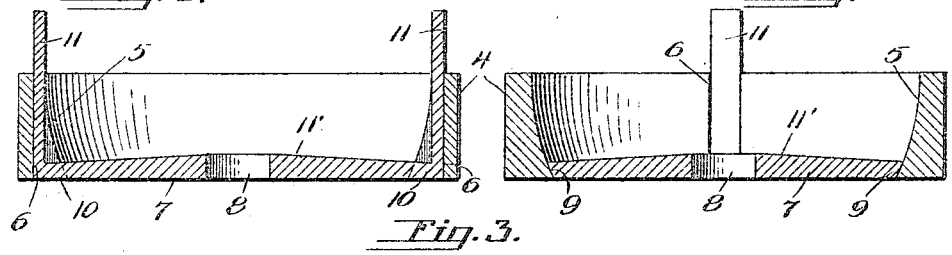
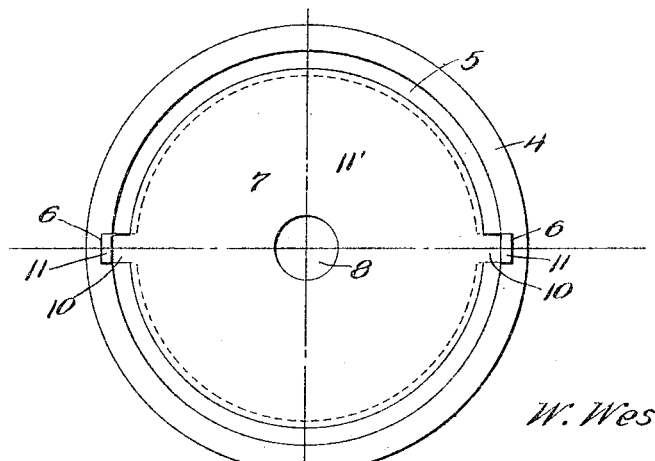

WILLIAM WESTBURY, OF OKMULGEE, OKLAHOMA, ASSIGNOR TO L. S. SKELTON, OF OKMULGEE, OKLAHOMA.

DRAWING-RING.

1,225,542.   Specification of Letters Patent.   Patented May 8, 1917.

Application filed February 8, 1916. Serial No. 77,053.

*To all whom it may concern:*

Be it known that I, WILLIAM WESTBURY, a citizen of the United States, residing at Okmulgee, in the county of Okmulgee and State of Oklahoma, have invented new and useful Improvements in Drawing-Rings, of which the following is a specification.

This invention relates to drawing rings for glass drawing apparatus, and particularly to floating rings of the type embodying a special construction for securing a remelting and draining of the aftermath from the ring.

The primary object of the invention is to provide a floating ring having an adjustable bottom provided with an inlet opening and adapted to be elevated within the ring to expose the aftermath for remelting and to provide a passage for the drainage of the remelted glass back into the tank.

A further object of the invention is to provide a novel construction of ring body and adjustable bottom whereby the remelting of the aftermath and drainage of the same back to the tank will be facilitated.

The invention consists of the features of construction, combination and arrangement of parts hereinafter fully described and claimed, reference being had to the accompanying drawings in which:—

Figure 1 is a vertical section through a glass receptacle, guard ring and drawing ring, and showing the parts of the drawing ring in normal position as they appear prior and subsequent to the drawing operation.

Fig. 2 is a similar view showing the parts of the ring as they appear during the drawing operation.

Fig. 3 is a top plan view of the drawing ring *per se*.

Figs. 4 and 5 are enlarged vertical sections taken through the ring in planes at right angles to each other, and showing more fully the construction of the ring.

Referring to the drawing, 1 designates a doghouse or other glass receptacle having a drawing opening 2, and 3 designates the usual guard ring for protecting the surface of the glass and bottom of the cylinder from sudden drafts of air. This guard ring is designed to rest upon the rim edge of the drawing ring and to be raised and lowered by any suitable means, not shown, for the purpose of depressing the drawing ring down into the body of molten glass and releasing and permitting it to rise to the surface of the glass.

The drawing ring comprises a ring-shaped body 4 of fire clay or other suitable material, which body is of uniform diameter externally, but internally is of maximum diameter at the top and thence has its inner wall 5 tapered or sloping toward its bottom, at which point it is of minimum diameter internally. Upon its interior the ring body is formed at diametrically opposite sides with retaining and guide grooves 6, which extends from top to bottom thereof.

Arranged within the ring body 4 is a movable bottom or partition plate 7, formed of metal or other suitable material, and having a central inlet opening 8 for the supply of the molten glass from the tank or receptacle to the interior of the ring. The bottom or partition 7 is of a diameter corresponding to the diameter of the bottom portion of the interior of the ring, or portion of least diameter thereof, and has a beveled peripheral edge 9 which is formed to fit the base of the curved wall 5 and by frictional engagement therewith holds the bottom or partition plate against further downward movement or displacement when said bottom or partition plate is in its lowermost position within the ring body, as shown in Fig. 2. The plate is provided at diametrically opposite sides of its edge 9 with lateral projections or lugs 10 from which extend upright guide arms 11 which slidably engage grooves in the body 4 to guide the partition plate in a straight line and hold it from independent rotation. As shown, the inlet opening 8 is at the center or thickest portion of the body of the plate, the upper surface 11' of which slopes toward the beveled edge 9, thus providing an inclined shelf for the drainage off of the aftermath, as hereinafter described.

In the use of the drawing ring, the ring is brought into operative position in line with the drawing opening and immediately beneath the shield or jacket 3, said jacket or shield being then forced downward to depress the ring and bring the ring body into engagement with blocks or supports 12 within the receptacle 2, by which the ring is caused to form a pot which is filled through the opening 8 up to the surface level x—x of the molten glass in the receptacle with a charge of glass for the drawing action. The cylinder is then drawn and the jacket or shield elevated, thus allowing the pot body 4 to float upward and the bottom or disk 7 to also float and rise within the pot to the position shown in Fig. 1, whereby the upper surface of the bottom 7 will be brought to a position above the level of the liquid for the melting of the aftermath or residuum, which flows down the sloping surface 11' to and over the peripheral edge 9 of said bottom 7. This elevation of the bottom 7 within the body of the ring or pot brings the bottom at the level of the portion of greatest diameter of the ring, thus forming a drain passage 12' between the surfaces of the bottom and ring for the drainage of the melted aftermath or residuum back into the body of glass in the tank. When the shield 3 is elevated, as shown in Fig. 1, the movable bottom 7 and ring 1 may be depressed by means of a suitable tool, to bring the arms 11 below the shield and thereby permit the ring to be moved back and forth between the main part of the furnace and dog-house or drawing chamber.

It will thus be seen that the invention provides a drawing ring or pot in which provision is made for taking up fresh charges of glass from beneath the surface of the molten glass for the drawing actions and the subsequent remelting and drainage off of the aftermath, so that the surfaces of the ring or pot will be kept clean and the body of glass in a properly purified condition. It will of course be understood that any suitable means may be employed for bringing a ring or pot into position for use and afterward forcing it back into the tank for the remelting of the aftermath.

I claim:—

1. A drawing ring or pot comprising a ring-shaped body, and a bottom or partition vertically movable in said body and provided with an inlet opening, said bottom or partition operating when in a determined position to form a drain passage between the same and the pot body.

2. A glass drawing ring or pot comprising an annular body and a movable bottom or partition having an inlet opening and adapted when in a raised position to form a drain passage between the edge thereof and the pot body.

3. A drawing ring or pot comprising a ring-shaped body having a portion of minimum diameter at the bottom thereof, and a bottom or partition adjustable in said body and having an inlet opening therein, said bottom being engageable with said portion of minimum diameter when lowered and adapted when elevated to be spaced from the wall of the body to form an intervening drain passage.

4. A glass drawing ring or pot comprising a ring-shaped body, and a body or partition adjustable vertically therein, and provided with a glass inlet opening, said body and bottom having surfaces to close the bottom of the pot with the exception of said opening when the bottom is in lowered position and to form a drain passage when the bottom is in raised position, said bottom having an upper surface sloping from said opening toward its peripheral edge, such edge being adapted when the bottom is elevated to be spaced from the wall of the body to form an intervening drain passage.

5. A glass drawing ring or pot comprising a ring-shaped body, and a body or partition adjustable vertically therein, and provided with a glass inlet opening, said body and bottom having sloping surfaces to close the bottom of the pot with the exception of said opening when the bottom is in lowered position and to form a drain passage when the bottom is in raised position, said bottom having an upper surface sloping from said opening toward its peripheral edge, such edge being adapted when the bottom is elevated to be spaced from the wall of the body to form an intervening drain passage.

6. A glass drawing ring or pot comprising an annular body and a movable bottom or partition having an inlet opening therein, said bottom or partition adapted when in a raised position to be spaced at its edge from the pot body so as to form a drain passage between the peripheral edge thereof and the wall of the pot body, and said bottom or partition having an inclined drain surface sloping from said inlet opening toward said peripheral edge.

7. A glass drawing ring or pot comprising an annular body and a vertically movable body or partition therein, said body or partition having a central inlet opening, the body and partition being provided with surfaces arranged to respectively recede from and approach each other in the relative upward and downward movements of the bottom or partition, said bottom or partition being provided with an upper surface sloping from the inlet to its peripheral edge.

In testimony whereof I affix my signature in presence of two witnesses.

WILLIAM WESTBURY.

Witnesses:
A. L. NIXON,
J. T. PANCOAST.